United States Patent Office 2,908,202
Patented Oct. 13, 1959

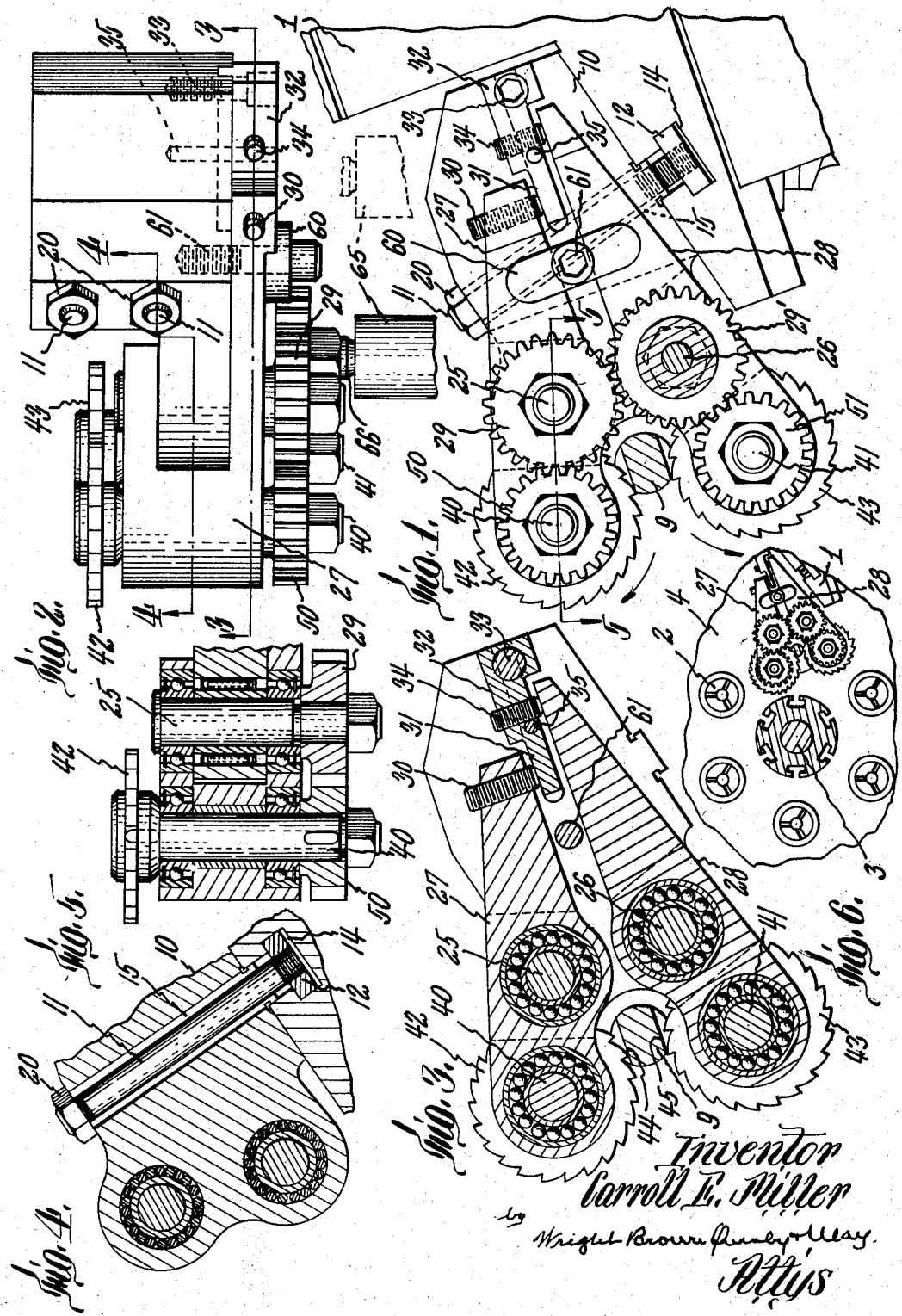

2,908,202

CROSS SLIDE MILLING ATTACHMENT

Carroll E. Miller, Windsor, Vt., assignor to Cone Automatic Machine Company Inc., Windsor, Vt., a corporation of Vermont Application March 1, 1956, Serial No. 568,816

3 Claims. (Cl. 90—16)

This invention relates to milling attachments for lathes and particularly for multiple spindle lathes. One object of the present invention is to provide means for adjusting the cutters to provide for adjustment for the depth of cut on opposite sides of a work piece. A further object is to provide for rotation of two milling cutters arranged to mill opposite sides of a work piece, with both cutters rotating in the same direction relative to their direction of feed with respect to the work. Where the cutters rotate in opposite directions relative to the feed direction, the one rotating in the same direction as the direction of feed sets up a back pressure on the feed cam and cuts satisfactorily, while the other cutter tends to climb up to the work and grip thus tending to take a larger bite on the work than the other and so break the cutter teeth. With the arrangement shown herein both cutters operate satisfactorily.

Figure 1 is a view of the attachment shown as operating upon the end portion of a work piece projecting from a non-rotating work spindle;

Figure 2 is a top plan view of the same;

Figures 3 and 4 are detailed sectional views on lines 3—3 and 4—4 respectively of Figure 2;

Figure 5 is a detailed sectional view on line 5—5 of Figure 1;

Figure 6 is a fragmentary view partly in section and to a reduced scale showing the arrangement of the spindles of a 6-spindle lathe and showing the cutters arranged to operate on a work piece at the fifth station.

Referring to the figures of the drawings, at 1 is shown a tool slide for a multiple spindle lathe which, as is well known in the art, is movable toward and from a work carrying spindle 2 in one of the several operating stations of a multiple spindle lathe as shown in Figure 6. Six such spindles are shown arranged in symmetrical array about a central axis 3 of a carrier 4, which as is well known in the art is made to present each of the spindles in succession into each of the six stations arranged symmetrically about the axis of the carrier. The tool slide 1 as shown in Figure 6, is arranged to carry tools operating at the number 5 position of the spindles and in accordance with this invention it has attached thereto a milling attachment which is designed to slab off opposite sides of a work piece 9, projecting from the spindle at this particular station and at the station this spindle is non-rotating. It will be understood that means for locking or holding the spindles against rotation at various stations is old and well known in the art and no showing of this is deemed necessary for an understanding of the present invention.

The attachment as shown, comprises the support 10, which may be clamped to the slide by a pair of clamping studs 11 (see particularly Figures 1 and 4) each of which at one end has thereon a nut 12, arranged in an undercut groove 14, in the tool slide 1, the stud extending through a hole 15, through the support 10, and having on its outer end a nut 20, which may be tightened to secure the support 10 rigidly to the tool slide 1. This support 10 has journaled therein a pair of shafts 25 and 26 and on these shafts are rockably mounted a pair of arms 27 and 28. The shafts 25 and 26 have secured thereto intermeshing gears 29 and 29' and they also serve as locking fulcra for the arms 27 and 28. These arms 27 and 28 extend outwardly from the shafts 25 and 26. Through the outward extension of the arm 27, there is threaded an adjusting screw 30, the inner end of which bears against a face 31 of a block 32 which is secured to the support 10 as by a bolt 33. An adjusting screw 34 is threaded through the block 32 and engages the inner face of the rear end portion of the arm 28. A pin 35 extends through the block 32 and into the support 10, and this together with its screw 33 acts to hold the block 32 rigidly in position. Adjustment of the adjusting screw 30 adjusts the angular position of the arm 27, and adjustment of the screw 34 adjusts the angular position of the arm 28, these adjustments being independent of each other.

The arms 27 and 28 also have journaled therein cutter shafts 40 and 41, each carrying a milling cutter as 42 and 43, these cutters being placed opposite to each other and arranged to mill separate faces 44 and 45 of the work piece. It will be noted that since these cutter shafts carry gears 50 and 51 which mesh with the intermeshing gears 29 and 29', rotation of either of the gears 29 and 29' produces a rotation of the corresponding milling cutter in the same direction relative to the line of feed of the tool slide, and as shown in Figure 1 toward the axis of the cylindrical spindle carrier. The angular position of the arms 27 and 28 may be fixed after an adjustment by means of a clamp plate 60 over an edge of each of the arms 27 and 28 and secured to the support 1 as by a screw 61. Either one of the shafts 25 and 26 may be connected for rotation to thereby rotate the milling cutters and for this purpose there is shown in Figure 2 an end portion of a flexible shaft 65, connected to be driven from the machine in any suitable manner and having its end portion 66 connected with one of the shafts 25 or 26 in any well known manner, this flexible shaft permitting the end portion 66 to move with the tool slide as it feeds or retracts the milling cutters with respect to the work piece, the extreme positions of this shaft portion 65 being indicated in dotted lines in Figure 2.

From the foregoing description, it will be evident that provision is made for rotation of both milling cutters on opposite sides of the stationary work piece in the same direction relative to the direction of feed of the tool slide so that desired results in the action of the cutter is obtained.

From the foregoing description of this it is evident to those skilled in the art that various changes and modifications may be made without departing from its spirit and scope.

I claim:

1. A milling attachment for a lathe which comprises a support having means for securing it to a tool slide, a pair of arms pivoted to said support, a pair of intermeshing gears rotatable about the pivotal axes of said arms, a cutter shaft in each arm, driving connections between each of the said gears and the cutter shaft carried by the respective arm near an end thereof, a milling cutter carried by each of said cutter shafts for operation on the front side of the work piece, means near the other end of each arm for adjustably limiting movement of each cutter shaft away from the other, and means for rotating said gears during all positions of said supoprt due to motion of said tool slide.

2. A milling attachment for a lathe which comprises a support having means for securing it to a tool slide, a pair of arms pivoted on said support, a pair of intermeshing gears rotatable about the pivotal axes of said arms, a cutter shaft journaled in each arm, a milling cutter with teeth on each said shaft, driving connections between each of said gears and the cutter shaft carried by the respective arm and constructed and arranged to rotate both said cutters so that the cutting movements of the teeth are in the same direction as the direction of motion of said tool slide, means for independently adjusting the angularity of said arms with respect to said support, and means for rotating one of said gears during all positions of said support due to motion of said tool slide.

3. A milling attachment for a lathe which comprises a support having means for securing it to a lathe tool slide, a pair of shafts journaled in said support in spaced parallel arrangement, a pair of intermeshing gears carried by said shafts, an arm journaled on each of said shafts, a member fixed to said support and extended between said arms, means for angularly adjusting said arms, a cutter shaft journaled in each of said arms, means for clamping said arms in adjusted angular positions, and a gear mounted on each said cutter shaft, said cutter shaft gears meshing respectfully with said parallel shaft gears.

References Cited in the file of this patent

UNITED STATES PATENTS

| | | |
|---|---|---|
| 979,972 | Leland | Dec. 27, 1910 |
| 2,051,159 | Witte | Aug. 18, 1936 |
| 2,375,789 | Hungerford | May 15, 1945 |
| 2,679,773 | Scott | June 1, 1954 |